United States Patent Office 3,843,336
Patented Oct. 22, 1974

3,843,336
ARTIFICIAL FIREPLACE LOG
Henry C. Messman, Larchmont, N.Y., assignor to The Kingsford Company, Louisville, Ky.
Filed Aug. 31, 1972, Ser. No. 285,370
Int. Cl. C10l 5/00, 5/14, 5/40
U.S. Cl. 44—25
44 Claims

ABSTRACT OF THE DISCLOSURE

A self supporting log having about seventy percent of its fuel value derived from petroleum derivatives contained therein and a continuous process for making the log are described. The log has an extruded thermoset resin skeleton highly filled with particulate vegetable matter. The woody particles are preferably initially impregnated with one or more petroleum derivatives, and subsequently added to an aqueous solution of a prepolymer resin mix. The mixture is then extruded with preferably a screw extruder having a heated die barrel to concentrate the thermoset resin at the outer surface of the extrusion, forming a continuous casing. The log, therefore, may be handled for packaging nearly immediately after the extrusion passes through a cutting machine. In a preferred embodiment the resin is urea-formaldehyde and the woody particles are sawdust initially impregnated with fuel oil and subsequently with wax, prior to incorporation in an aqueous, catalyzed solution of methylol urea for extrusion.

---

This invention relates to artificial fireplace logs and to a continuous, hot extrusion process for making a highly filled, porous resin log. The log of this invention includes an extruded, thermoset resin skeleton filled with particulate vegetable matter. The woody particles are initially impregnated with oil or other petroleum derivatives and subsequently added to a prepolymer resin mix. The mixture is then extruded using a heated die barrel that sets the resin while it is concentrated at the outer surface of the extruded log.

Many different types of artificial logs are known, and several have been commercially available for many years. Prior artificial logs, however, have several disadvantages which reduce their desirability for general fireplace use.

One well known type of artificial log, an extrusion, compacting particulate woody material, has proven to be hard to light because combustion is supported by the compacted woody material only. In addition, at least two to three of such logs are required in a fireplace in order to maintain the fire once it is ignited. Most importantly, however, the outer surface of this log tends to be friable rendering it difficult to handle without rubbing flakes of particulate material therefrom. The log also has poor hot strength, losing cohesion rapidly as it burns, and it therefore must be burned on a grate rather than on andirons.

Many other types are known wherein a substrate such as reclaimed pulp, sawdust, or ground cedar chips is compacted with a wax binder, Although these logs may be handled without crumbling, they are pliable under relatively warm ambient conditions, and must also be burned on a grate because they lose cohesion very rapidly and collapse almost immediately after being warmed through.

For example, one type of log which uses a wax binder is described in U.S. Pat. No. 3,297,419 to Eyre, Jr. This log is constructed using slack wax, said therein to be a deoiled mixture of paraffin and microcrystalline waxes, as a low temperature binder for a sawdust substrate. The wax serves as a fuel and maintains cohesion prior to ignition. In addition, a high temperature binder such as a lignin sulfonate is added to maintain cohesiveness as the log burns.

However, this high temperature binder is not compatible with the petroleum derivatives in the log which wet the surface of the sawdust particles. It also rapidly loses its adhesive properties as the wax liquifies when the log is heated to ignition. This log therefore also collapses shortly after ignition, and must be burned on a grate.

However, it has now been discovered that a superior artificial log may be produced according to this invention. The log of this invention will ignite easily, burn at a moderate rate, and maintain combustion without the presence of one or more additional logs. The log of this invention also exhibits excellent hot strength similar to natural wood so that it may be burned on andirons without a grate, if desired.

It is an essential feature of this invention to provide a self supporting skeletal structure for the log by extruding a thermoset resin highly filled with particulate woody material. In addition, by utilizing an extruder having a heated die barrel the resin will be thermoset at the outer surface of the extrusion to form a continuous casing. The log, therefore, will be formed with a polymerized casing sufficiently solid for handling and packaging nearly immediately after extrusion, even though the interior thereof may not fully polymerize for up to one to two days.

While a variety of well known thermoset resins could be used within the scope of this invention to provide the skeletal log structure, a resin condensable in thermosetting fashion from a simple aldehyde such as formaldehyde or paraformaldehyde is preferred. Specifically, although resins such as phenol-formaldehyde, resorcinol-formaldehyde, epoxies, or mixtures thereof could be used, urea-formaldehyde is preferred.

A urea-formaldehyde prepolymer or intermediate is available commercially as an aqueous solution of methylol urea from, for example, Reichhold Chemical Inc., White Plains, N.Y. The solution typically is alkaline and has a pH of up to about 8 to 8.2. The solution contains about 65–75 percent solids with a molecular weight averaging between that of methylol and dimethylol urea. As is well known, methylol urea solutions have a relatively short shelf life of from about 30–60 days, and accordingly fresh solutions are preferred.

Commercially available methylol urea solutions are prepared, typically, by condensing two or three moles of formaldehyde and one of urea in the presence of ammonia and an alkaline catalyst. The reaction is then stopped at the syrupy linear stage.

Subsequently, when the mixture is subjected to heat and pressure, typically in the presence of an acidic catalyst, rapid polymerization occurs to form polycondensation products known as urea-formaldehyde resins. As is well known, polymerization conditions may be rendered less critical through the addition of an extender such as soft wheat flour to the syrupy mixture.

The filler for the resin log of this invention may be particulate woody materials such as sawdust, ground mill or planing wastes, hulls such as peanut shells, or other available woody materials having similar characteristics. In the preferred embodiment of this invention the woody particles typically are less than about one eighth inch in size.

Another feature of this invention includes the discovery that the woody particles may be impregnated rather than merely wetted with one or more petroleum derivatives and then added as filler for the prepolymer mixture. The impregnated filler has been found to substantially enhance the fuel value and burning characteristics of the artificial log of this invention.

Although superior artificial logs may also be produced when the extruded resin skeleton is filled with particulate woody materials, and subsequently, dipped in a molten wax bath, it is preferred to incorporate petroleum derivatives in the log as an impregnate for the woody particles. Even though methylol urea, condensed from a water solution, does not form a strong bond with oil impregnated woody particles, it has been discovered that, in order to form the log of this invention, the thermoset resin need not adhere to the particles as a binder. The resin, when polymerized, forms a durable skeleton which will entrain impregnated particles dispersed therein as a filler.

In the preferred embodiment of the process of this invention therefore, the sawdust or other woody materials are initially dried and degassed by heating until the moisture content thereof is less than ten percent, and preferably about five percent. The heated sawdust is then admixed with a heated petroleum derivative in a jacketed pre-mixer, maintained at a temperature of up to about 200° F. The petroleum derivative may be any petroleum fraction, ninety-five percent or more of which distills at above 400° F., such as No. 4 furnace oil. If desired, however, a petroleum wax may also be added. While a refined wax containing less than five percent oil could be used, a semi-refined or crude wax such as scale wax, slack wax, slop wax, or rod wax which may contain up to about forty percent or more oil, is preferred.

The mixture is then partially cooled to facilitate the absorption of the oil in the relatively small pores of the filller and absorption of the wax in the larger pores thereof. Subsequently the impregnated particles are conveyed to a final, jacketed mixer wherein they are admixed with the catalyzed resin prepolymer solution under controlled temperature conditions.

Certain special purpose compositions may be added to the mixture in the final mixer. For example, oxidizing agents to facilitate combustion, metallic salts such as copper or strontium salts to provide a colored flame, sodium nitrate prills which sizzle and crackle as the log burns to simulate the burning of a natural log, and oil gellants such as fumed silica or carnauba wax may be added, if desired.

From the final mixer the mixture is conveyed, in a preselected period of time, to an extruding machine having a steam jacketed die barrel wherein it is extruded. The extrusion formed is then cut in fireplace lengths and may be immediately wrapped and packaged for shipment if desired.

The amount of catalyst present, the transport time from the final mixer through the extruder and the temperature of the mixture must be carefully controlled, as will be subsequently explained, to avoid polymerization of the mixture in the extruder. If the mixture begins to set before it reaches the die barrel, the polymer casing may have fissures and cracks therein, and if a screw extruder is used, the casing may have helical screw marks which will weaken the skeletal structure of the log.

As will be obvious to those skilled in the art, the quantity of oil and/or wax added may be varied substantially. For example, a log may be preproduced using only crude or semi-refined wax, which contains varying amounts of oil; wax may be eliminated and only fuel oil added to produce a relatively inexpensive product; or both may be used. In addition, although not preferred, petroleum derivatives to increase the fuel value of the log may be eliminated from the mixture, and the log may be extruded or formed in a hot mold and subsequently dipped in a cooler molten wax bath. The wax is absorbed then on the surface of the log. Absorption wil be hindered, however, because the resin tends to blind pores in the woody particles.

Accordingly, it is an object of this invention to provide an artificial fireplace log wherein about seventy percent of the fuel value thereof will be furnished by one or more petroleum derivatives contained therein.

It is another object to provide an artificial log which may be easily ignited, which will exhibit good hot strength while burning so that it will not collapse when warmed through and may be burned resting on andirons, and which will support combustion without the presence of one or more additional logs.

It is still another object to provide an extruded, highly filled thermoset resin log having a polymerized resin skeleton filled with particulate woody materials.

It is still another object to provide an extruded thermosetting resin log having wood particles dispersed therethrough wherein the resin forms a concentrated outer casing and an inner porous matrix highly filled with said particles having petroleum derivatives absorbed therein.

It is yet another object to provide a continuous process for forming artificial fireplace logs by admixing particulate woody materials with a catalyzed thermosetting resin prepolymer, and subsequently, hot extruding said mixture to form a highly filled thermoset resin log.

It is another object to provide a continuous process for forming artificial fireplace logs wherein particulate woody materials are initially heated, dried, impregnated with hot fuel oil and wax, cooled, and admixed with a catalyzed methylol urea solution for subsequent hot extrusion to form a fireplace log having a urea-formaldehyde skeleton highly filled with said particulate materials.

It is another object to provide a continuous process for forming artificial fireplace logs wherein particulate woody materials are initially admixed with a resin prepolymer solution, which solution includes an acid catalyst, and the mixture hot extruded to form a highly filled porous resin log which subsequently is dipped in a molten bath of crude wax whereby said log absorbs a quantity of said wax to increase the fuel value thereof.

It is still another object to provide a continuous process for forming artificial fireplace logs wherein particulate woody materials are initially heated, dried, and admixed with a hot petroleum fraction, cooled, and admixed with a catalyzed methylol urea solution, hot extruded, and subsequently dipped in a molten bath of crude wax to increase the fuel value thereof.

These and other objects will become apparent with reference to the drawings and following description wherein.

Figure 1:
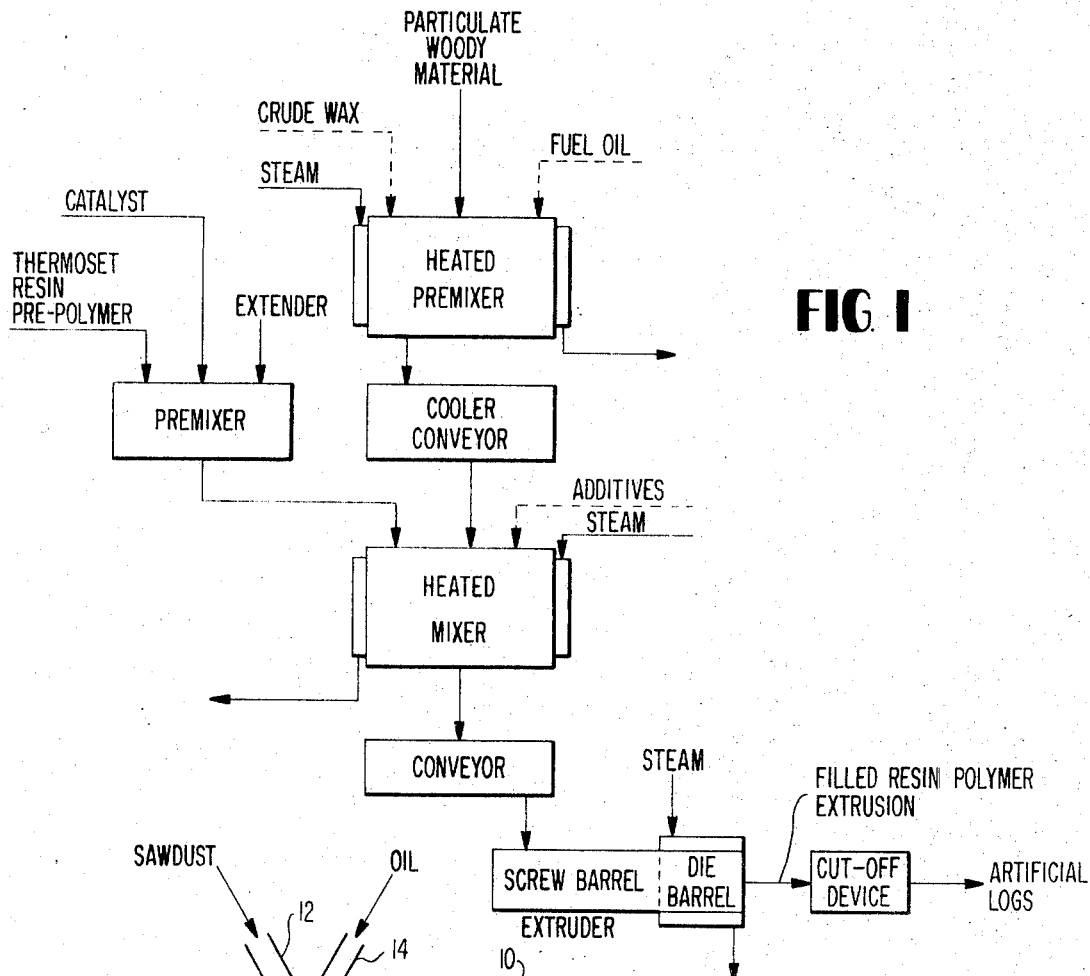
FIG. 1 is a flow sheet illustrating the process for making the artificial log of this invention.

With attention to the drawings and to FIG. 1 in particular, the process of this invention may be broadly described as follows:

Particulate woody materials such as sawdust, ground bark, hulls such as peanut shells, or the like having dimensions of from about ⅛ to ¼ inch, but preferably reduced to a particle size that can pass through a ⅛ or smaller screen, are initially heated, dried, and degassed in conventional drier until the moisture content thereof is less than about ten percent, or preferably about five percent.

Typically, the woody materials are heated up to about the boiling point of the moisture contained therein. The hot particles are then fed into a steam jacketed pre-mixer, and the temperature in the pre-mixer is maintained at about 175–200° F.

One or more petroleum derivatives, in one embodiment of this invention, are mixed with the hot woody particles in the pre-mixer. The petroleum derivatives may be crude wax containing up to about 40 percent oil, or more, or a fuel oil such as No. 4 furnace oil, or both. The petroleum derivatives are preferably preheated up to about 175° F. to facilitate absorption.

The materials are admixed for about five minutes in the pre-mixer, and discharged into a conveyor wherein they are cooled. The conveyor is preferably a conventional hollow screw conveyor having a liquid coolant circulating through the screw, or any other well known cooler-conveyor. The materials are then conveyed to a steam jacketed, final mixer.

As will be subsequently explained, the temperature in the cooler-conveyor and the mixer must be carefully controlled, but in a preferred embodiment could be maintained at about 90 to 100° F.

In a second premixer, the thermosetting resin prepolymer solution is admixed with a suitable catalyst therefor, and an extender, if desired.

A variety of resins may be employed within the scope of this invention. However, the resin used must be a thermoset resinous material that, without substantial softening below 300° C., will maintain its polymer bonds during carbonization and combustion of the filler and other volatile matter entrained therein. It is preferred in this invention to utilize a resin condensed in thermosetting fashion with a simple aldehyde such as formaldehyde or paraformaldehyde or the like. Accordingly, the preferred resin utilized to produce the log of this invention is a urea-formaldehyde resin.

As is well known in the art a resin prepolymer, or linear stage intermediate is available commercially as aqueous methylol urea solutions. The commercial solutions are used normally in the production of plywood. It has been discovered, however, that commercially available methylol urea, typically sixty-five to seventy-five percent solids in an aqueous solution having a pH of up to about 8–8.2, is excellent for use in forming the log of this invention.

The catalyst for promoting condensation of the urea-formaldehyde resin is a soluble acid salt such as ammonium chloride or ammonium sulfate with ammonium chloride being preferred. The catalyst functions to lower the pH of the solution and thereby promote cross-linking and polymerization of methylol urea to form the solid urea-formaldehyde resin.

As is also well known an extender may be added to the resin if desired.. The extender may be used to slow polymerization and render exact process conditions such as time, temperature, and catalyst concentration less critical. A preferred extender is soft wheat flour which may be added in quantities, as desired.

The catalyst, resin, and extender, if used, are admixed in the second pre-mixer and conveyed to the heated final mixer wherein they are combined with the impregnated woody particles.

The mixture is then discharged from the final mixer into a conveyor and transported therein to an extruder. Although other extruders could be used, a screw extruder having a steam-jacketed die barrel is preferred.

After the mixture is compacted in the extruder screw barrel and as the material is forced through the hot die barrel, it polymerizes to form a more concentrated resinous casing surrounding a less concentrated skeletal matrix with the impregnated woody particles interspersed therethrough.

In the preferred version of this invention a screw barrel having a four inch inside diameter is used. The die barrel, however, has a slightly larger diameter, such as about 4¼ inches. The larger die barrel contributes to the formation of a compacted but less dense log, and therefore a more desirable product. It is, of course, undesirable to make the log too dense by compacting in the extruder because the resultant product will be heavy, hard to light, and less uniform because in all likelihood, compaction will squeeze oil from the woody particles.

The extrusion formed will have a four inch diameter approximately, and is cut in lengths in a cut-off device of well known design. The extrusion will be cut in approximately 16 inch lengths to form artificial fireplace logs weighing about 6 lbs. apiece. The logs formed have been found to exhibit adequate handling strength and may be conveyed directly to conventional wrapping and packaging stations, if desired.

In another embodiment of this invention the dried woody particles may be conveyed directly to the final mixer and admixed with the catalyzed, extended resin prepolymer. The mixture may then be extruded and cut in fireplace lengths. The fireplace lengths are then conveyed through a molten wax bath wherein wax is absorbed in the hot log to increase the fuel value thereof.

In a further embodiment, as will be obvious to those skilled in the art, either fuel oil or wax may be absorbed by the particulate material as hereinabove described, and the subsequently formed log may also be dipped in a cooler molten wax bath wherein the wax is absorbed therein for additional fuel value. As stated, however, it is preferred to initially impregnate the hot woody materials with both fuel oil and crude wax dispensing with a final dipping step, so that the logs formed in the extruder may be cut and immediately wrapped for shipment.

The following are detailed examples of alternate processes which may be utilized to form the artificial log of this invention.

EXAMPLE I

Figure 2:
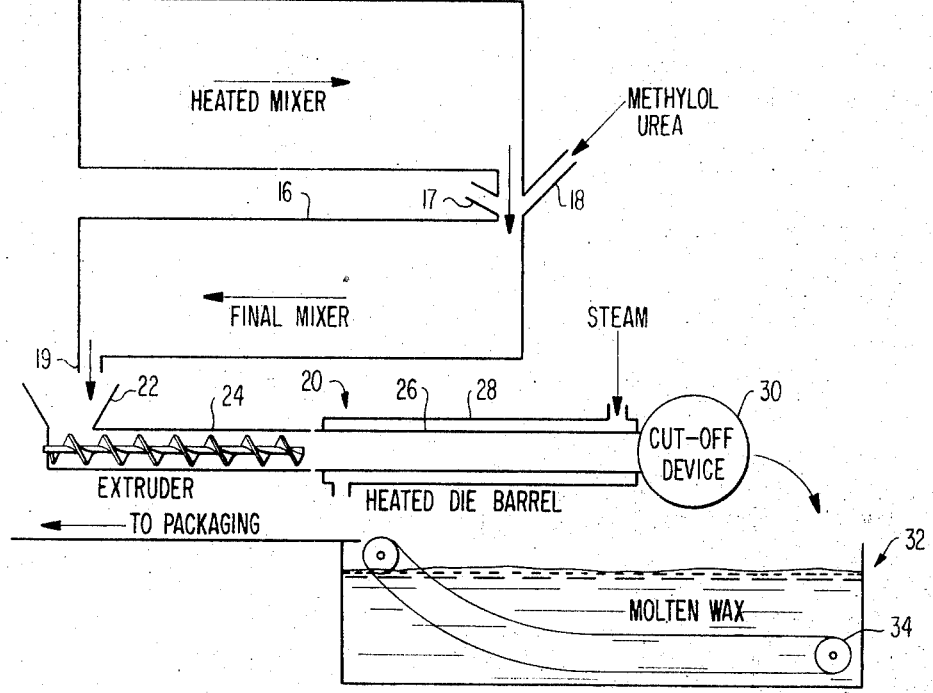
FIG. 2 is a schematic diagram showing certain equipment which may be utilized in an alternate embodiment of this invention.

With reference to FIG. 2, logs having a flame life exceeding two hours which, when burned on andirons, will not collapse until about ninety minutes after ignition, may be formed as follows. Heated sawdust having a moisture content of less than ten percent is added to pre-mixer 10 through conduit 12 and a petroleum derivative, No. 4 fuel oil, is added to pre-mixer 10 through conduit 14. The oil and sawdust are present in mixer 10 in proportions by weight of 15 parts oil to 45 parts sawdust (dry basis). The temperature in mixer 10 is maintained at approximately 175°–200° F. while the sawdust absorbs the oil.

The oil impregnated sawdust from pre-mixer 10 then enters final mixer 16 where it is admixed with ten parts of a sixty-five percent methylol urea solution and about one fluid ounce of a twenty-five percent ammonium chloride catalyst solution. The materials are admixed in mixer 16 for approximately three minutes and immediately conveyed through outlet 19 into the hopper 22 of extruder 20. The materials are compacted in the screw barrel 24 of extruder 20 and conveyed into the die barrel 26 heated by steam jacket 28. The inside diameter of screw barrel 24 is four inches and the inside diameter of die barrel 26 is about 4¼ inches. The extrusion passes through the heated die barrel with a residence time of typically about one minute.

The approximately four inch extrusion is cut in sixteen inch lengths by a conventional cut-off device 30, and immediately immersed in molten crude petroleum wax in bath 32. The wax is maintained in bath 32 at a temperature of about 200° F. The logs are conveyed by conveyor 34 through bath 32 with a residence time of approximately five minutes. During this time the logs absorb an additional thirty parts of wax (and oil).

Logs produced according to this process were found to be amply strong to withstand immediate handling and shipment.

EXAMPLE II

With reference to FIG. 2, an alternate embodiment of the log of this invention, typically having a flame life of less than about seventy-five minutes, may be produced as follows. Sawdust or small particle bark having a moisture content of less ten percent is admitted directly into final mixer 16 at inlet 17. In mixer 16 forty-five parts sawdust are admixed with ten parts of a sixty-five percent aqueous methylol urea solution, catalyzed with one fluid ounce of a twenty-five percent ammonium chloride solution added through conduit 18. The ingredients are mixed in mixer 16 at ambient temperature for ten minutes, and subsequently conveyed to extruder 20.

The mixture exits mixer 16 at conduit 19 into hopper 22 for the screw barrel 24 of extruder 20. The mixture from screw barrel 24 then enters the heated die barrel 26 and passes therethrough with a residence time of about two minutes. As the mixture passes through die barrel 26 it polymerizes to form a concentrated resin casing with a porous interior matrix highly filled with the woody particles. The extrusion exits die barrel 26 and enters a conventional cut-off device 30 wherein the approximately four inch diameter extrusion is cut in about sixteen inch lengths which are immediately immersed in a molten crude petroleum wax bath 32. The crude wax bath is maintained preferably at a temperature of about 200° F.

As the logs enter bath 32 they are picked up by conveyor 34 and conveyed through the bath 32. The total residence time in the bath is approximately ten minutes, during which time the logs absorbed about twenty-five to thirty parts wax total. Conveyor 34 then conveys the dipped logs to a packaging station.

It should be noted that crude wax in bath 32 is typically about ⅓ oil, although it may contain as much as forty percent oil or even more. However, as noted above with Example I the sawdust may be preimpregnated with oil, if desired. The price of oil is less than that of crude wax. Therefore for only a slight additional cost a superior log may be formed according to Example I.

EXAMPLE III

Figure 3:
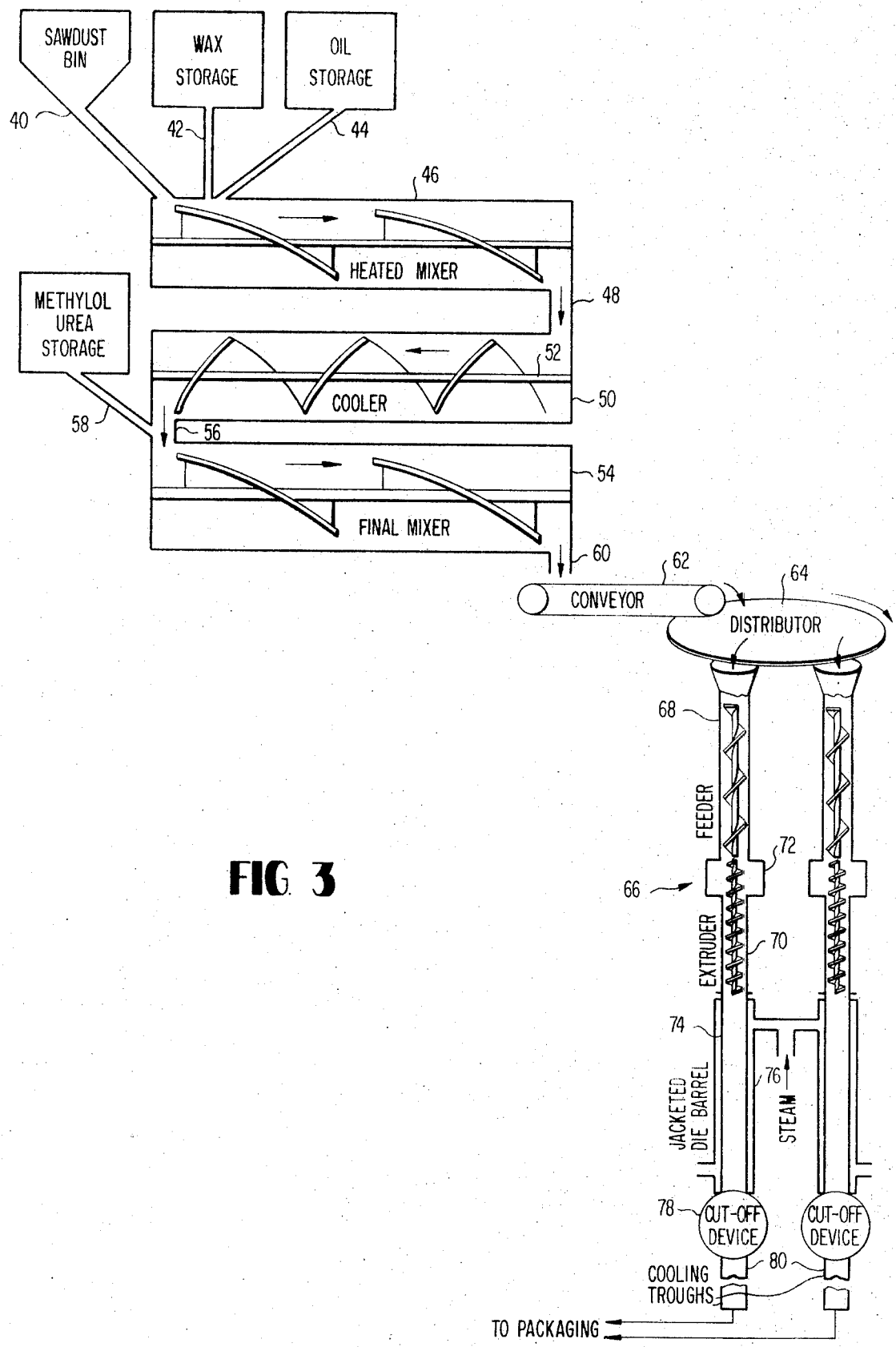
FIG. 3 is a schematic diagram illustrating certain equipment which may be used in a preferred embodiment of this invention.

In a preferred embodiment of this invention, with reference to FIG. 3, the final step of hot dipping the extruded logs is eliminated as will be hereinafter described.

Forty-eight parts mixed hardwood sawdust from a drier (not shown), twenty-two parts crude wax, and twenty parts No. 4 fuel oil are admitted, through conduits 40, 42, and 44, respectively, into a heated pre-mixer 46. The materials are admixed in mixer 46 at a temperature of about 175°–200° F., but preferably at about 185° F.

When thoroughly mixed the materials exit mixer 46 through conduit 48 and enter a cooler-conveyor 50. Cooler-conveyor 50 may be any commercially available type, but preferably has a hollow screw 52 with cooling water circulating therethrough. The materials are cooled in cooler 50 to a temperature of about 95° F., and after a residence time of approximately three minutes enter final mixer 54 through conduit 56.

Ten parts of a standard sixty-five percent methylol urea solution, preferably less than thirty days old, and three fluid ounces of a twenty-three percent aqueous solution of commercial quality ammonium chloride are also added through conduit 58 to mixer 54. The materials are maintained at a temperature of approximately 95° F. in final mixer 54 for a residence time of approximately three minutes.

The materials then exit mixer 54 through outlet 60 onto conveyor 62 whereby they are conveyed to a distributor such as rotating distributor table 64 of conventional design. The distributor 64 feeds one or more extruders 66.

The admixed materials from table 64 enter feed screw 68 for screw barrel 70 wherein they may be slightly precompacted by a baffle shown generally at 72. The materials are then compacted in screw barrel 70 and admitted into jacketed die barrel 74. One hundred to one-hundred-fifty pounds of steam are used in jacket 76 to heat the material in the die barrel.

It should be noted that the transport time from mixer 54 through conveyor 52, distributor 64, and extruder 66 is approximately five minutes. It should also be noted that the temperature of the mix is maintained at about 95° F. from the mixer 54 to the die barrel 74 wherein it is heated for polymerization.

Extruder 66 has an inside diameter of four inches, and may be any well known, commercially available screw extruder such as that manufactured by The Bonnet Company, Kent, Ohio.

As the extrusion exits die barrel 74 it passes through a conventional cut-off device 78 wherein the approximately four inch extrusion is cut in sixteen inch lengths to form artificial logs approximately six pounds in weight. From cut-off device 74 the logs pass along a cooling trough 80 to packaging machines of conventional design (not shown).

The temperature during mixing up to extrusion, the amount of catalyst added, and the transport time from the final mixer through the extruder are extremely important process conditions. For example, in this Example, the temperature was maintained at 95° F., three fluid ounces of a twenty-three percent solution of catalyst were added, and the transport time was five minutes. However, if the temperature is increased to 120° F., and one fluid ounce of catalyst is added, the transport time must be speeded to approximately one minute in order to avoid polymerization of the mixture in the screw barrel 70 of extruder 66.

Alternatively, if the temperature from the mixer to the extruder is lowered to 80° F., and six fluid ounces of catalyst are added, the transport time must be slowed to approximately 7–8 minutes in order to provide a mixture which will sufficiently polymerize in the die barrel to be handled in accordance with this invention as it passes through cut-off machine 78 and into cooling trough 80.

Finally, it has been found that the ingredient proportions may be varied, as desired. For example, the crude wax may be increased to thirty parts and the furnace oil decreased to fifteen parts to be admixed with forty-five parts sawdust in the pre-mixer 46 at a temperature of about 200° F. The material is then cooled to about 95° F. in cooler-conveyor 50, and is subsequently conveyed to final mixer 54 wherein ten parts of a sixty-five percent methylol urea solution, catalyzed as hereinabove described, is added thereto. The mixture is then extruded through the heated die barrel of extruder 66 and cut in lengths by device 78 as also described above.

As noted above with relation to FIG. 1, if certain special purpose additives are desired, they would be added in mixer 54 in quantities well known to those skilled in the art.

In summary, a process for making artificial logs has been described wherein the log is an extruded, highly filled, thermosetting resin which may be filled with wood particles and subsequently dipped in a molten wax bath. In the alternative, the wood particles may be impregnated with one or more petroleum derivatives, and admixed with a catalyzed resin prepolymer solution. The mixture then is extruded in a heated die barrel to form a highly filled thermoset resin log having a concentrated resin casing surrounding a porous resin matrix which may be handled and packaged nearly immediately. The log of this invention has been found to ignite easily and burn at a moderate rate for up to three hours. The log of this invention also exhibits excellent heat strength so that it may be burned on andirons rather than on a grate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A combustible artificial fireplace log comprising:
an extruded, highly filled, thermosetting resin skeleton forming a more concentrated outer surface surrounding a porous less concentrated interior matrix of said resin;
said skeleton being filled with particulate woody materials, and said log having a preselected quantity of at least one petroleum derivative hydrocarbon absorbed therein.

2. The log of claim 1 wherein said resin is an extended thermosetting resin.

3. The log of claim 1 wherein the resin is ureaformaldehyde.

4. The log of claim 1 wherein said woody materials have a water content of less than ten percent by weight.

5. The log of claim 2 wherein the resin is extended by soft wheat flour dispersed therein.

6. The log of claim 3 wherein the resin is present in an amount of from at least six to about ten percent by weight of said log.

7. The log of claim 6 wherein the particulate woody material is sawdust present in said log in an amount of at least about forty percent by weight.

8. The log of claim 3 wherein the petroleum derivative comprises a petroleum fraction ninety-five percent of which distills at above 400° F.

9. The log of claim 8 wherein the petroleum derivative comprises crude wax.

10. The log of claim 9 wherein said wax is absorbed into the outer portion of said log.

11. The log of claim 9 wherein said petroleum derivative further comprises furnace oil, said oil impregnating said particulate woody material.

12. The log of claim 9 wherein said crude wax is present in said log in an amount of from about twenty up to at least about thirty perecnt by weight.

13. The log of claim 11 wherein said oil is present in said log in an amount of at least about fifteen percent by weight.

14. A combustible artificial fireplace log comprising:
an elongated body formed by a highly filled thermoset resin skeleton, said skeleton having a more concentrated resinous outer surface and a less concentrated interior matrix;
particulate woody materials entrained in said skeleton and filling said resin; and
at least one petroleum derivative hydrocarbon saturating a major portion of said woody materials.

15. The log of claim 14 wherein said hydrocarbon is a petroleum derivative ninety-five percent of which distills at over 400° F.

16. The log of claim 15 wherein said hydrocarbon is furnace oil present in said log in an amount of at least fifteen percent by weight.

17. The log of claim 14 wherein said hydrocarbon is crude wax present in an amount of at least twenty percent by weight.

18. The log of claim 16 further comprising crude wax absorbed into at least the outer portion thereof, and present in said log in an amount of at least twenty percent by weight.

19. The log of claim 18 wherein said woody material is mixed hardwood sawdust and ground bark present in said log in an amount of at least about forty percent by weight.

20. The log of claim 19 wherein said resin is ureaformaldehyde present in said log in an amount of from about six to ten percent thereof.

21. The log of claim 14 wherein the resin is urea formaldehyde present in said log in an amount of from about six to ten percent by weight thereof.

22. The log of claim 21 wherein said woody material includes mixed hardwood sawdust and is present in said log in an amount of from forty to fifty percent by weight and the petroleum derivative includes furnace oil absorbed in said sawdust and present in said log in an amount of from about fifteen to about twenty percent by weight.

23. The log of claim 22 wherein said petroleum derivative further comprises crude wax present in said log in an amount of from about twenty to about thirty percent by weight.

24. The log of claim 23 wherein said wax is absorbed in said sawdust.

25. The log of claim 23 wherein said wax is absorbed into the outer surface of said log.

26. The log of claim 21 wherein said woody material includes mixed hardwood sawdust and is present in said log in an amount of from forty to fifty percent by weight and the petroleum derivative includes crude wax present in said log in an amount of up to about thirty percent by weight.

27. The log of claim 26 wherein said wax is absorbed in said sawdust.

28. The log of claim 26 wherein said wax is absorbed in the outer surface of said log.

29. A continuous process for making combustible artificial logs having a more concentrated, highly filled thermoset resin outer surface and a porous interior resin matrix comprising the steps of:
providing a preselected quantity of a prepolymer resinous solution;
providing a preselected quantity of polymerization catalyst therefor;
providing a preselected quantity of particulate woody material;
admixing said solution, catalyst, and materials;
subsequently extruding said mixture through a heated, extruder die barrel to form a hot thermoset resinous extrusion having a more concentrated outer surface and a porous interior matrix, both filled with said materials; and cutting said hot extrusion in lengths.

30. The process of claim 29 wherein the step of providing said solution and catalyst therefor further comprises:
providing an aqueous solution of about sixty-five to seventy-five percent, by weight, methylol urea and an aqueous solution of an ammonium acid salt.

31. The process of claim 30 further comprising degassing said woody materials and impregnating said materials with at least one petroleum derivative hydrocarbon before said materials are admixed with said solution and catalyst.

32. The process of claim 31 further comprising heating said materials to a temperature of about the boiling point of the moisture therein until the moisture content thereof is less than about ten percent; providing a preselected quantity of at least one petroleum derivative hydrocarbon ninety-five percent of which distills at over 400° F.; heating said hydrocarbon up to about 175°–200° F.; admixing said materials and said hydrocarbon to impregnate said materials therewith; and subsequently cooling said mixture before said impregnated materials are admixed with said solution and catalyst.

33. The process of claim 31 wherein said hydrocarbon comprises furnace oil.

34. The process of claim 33 wherein said hydrocarbon further comprises crude wax.

35. The process of claim 31 wherein said hydrocarbon comprises crude wax.

36. The process of claim 30 further comprising dipping said hot artificial logs in a cooler molten crude wax bath until said wax is absorbed therein.

37. The process of claim 33 further comprising dipping said hot artificial logs in a cooler molten crude wax bath until said wax is absorbed therein.

38. A continuous process for making artificial logs having a highly filled thermoset resin outer surface and a less concentrated interior matrix comprising the steps of:
providing particulate woody materials having maximum dimensions of less than about ¼ inch; heating said materials up to about 200° F. until the moisture content thereof is less than about ten percent;
providing at least one petroleum derivative hydrocarbon ninety-five percent of which distills at a temperature over 400° F.; heating said hydrocarbon up to a temperature of 175°–200° F.;
admixing said heated materials and said heated hydrocarbon to impregnate said materials therewith; cooling said mixture to a temperature of less than about 120° F.;
providing an aqueous solution of sixty-five to seventy-five percent methylol urea; providing an aqueous solution of ammonium chloride; admixing said solutions in preselected proportions; combining said catalyzed methylol urea solution and said impregnated materials in a mixer maintained at a temperature of from about 80°–120° F. for a preselected period of time, and subsequently extruding said combination in an extruder, having a heated die barrel, to form a continuous hot extrusion having a concentrated thermoset resin outer surface and an interior resin matrix highly filled with said impregnated particles; cutting said extrusion in preselected lengths to form artificial logs.

39. The process of claim 38 further comprising maintaining said catalyzed methylol urea solution and said impregnated materials in said mixer at a temperature of about 95° F. and admixing said solution and materials therein for about three minutes.

40. The process of claim 38 further comprising providing at least one screw extruder having a steam jacketed die barrel; providing 100 to 150 pounds of steam in said jacket; continuously extruding the admixed solution and impregnated materials from said heated mixer therein.

41. The process of claim 38 further comprising providing a molten bath of crude wax; dipping said artificial logs in said bath so that said logs will absorb a preselected quantity thereof.

42. The process of claim 38 wherein the step of providing said hydrocarbon comprises providing furnace oil and crude wax, said process further comprises admixing said heated oil, wax, and particulate materials in proportions of from about fifteen to twenty parts oil; about twenty to thirty parts wax and about forty to fifty parts woody materials, by weight.

43. The process of claim 42 wherein said methylol urea solution is added to said heated mixer in proportions of from about six to ten parts solution to about eighty to ninety-five parts of said impregnated woody materials.

44. The process of claim 41 further comprising absorbing said wax until from twenty-five to thirty percent by weight of said log comprises said wax.

References Cited

UNITED STATES PATENTS

| | | | |
|---|---|---|---|
| 3,615,286 | 10/1971 | Vander Linden | 44—21 X |
| 3,297,419 | 1/1967 | Eyre, Jr. | 44—10 R |
| 3,198,714 | 8/1965 | Johnson et al. | 44—25 X |
| 3,337,311 | 8/1967 | Lockhart | 44—10 R |

FOREIGN PATENTS

| | | | |
|---|---|---|---|
| 1,046,250 | 10/1966 | Great Britain | 44—25 |
| 1,033,987 | 6/1966 | Great Britain | 44—1 R |

CARL F. DEES, Primary Examiner

U.S. Cl. X.R.

44—1 R, 10 R

UNITED STATES PATENT OFFICE
CERTIFICATE OF CORRECTION

Patent No. 3,843,336      Dated October 22, 1974

Inventor(s) H. C. Messman

It is certified that error appears in the above-identified patent and that said Letters Patent are hereby corrected as shown below:

Column 9, line 38, claim 12, "perecnt" should read --percent--.

Column 10, line 61, claim 33, "claim 31" should read --claim 32--.

Column 12, line 8, claim 42, "further comprises" should read --further comprising--.

Signed and sealed this 14th day of January 1975.

(SEAL)
Attest:

McCOY M. GIBSON JR.
Attesting Officer

C. MARSHALL DANN
Commissioner of Patents